(12) United States Patent
Johnson

(10) Patent No.: US 11,330,807 B2
(45) Date of Patent: May 17, 2022

(54) ARTIFICIAL FISHING LURE

(71) Applicant: Galon H Johnson, Islamorada, FL (US)

(72) Inventor: Galon H Johnson, Islamorada, FL (US)

( * ) Notice: Subject to any disclaimer, the term of this patent is extended or adjusted under 35 U.S.C. 154(b) by 297 days.

(21) Appl. No.: 16/574,067

(22) Filed: Sep. 17, 2019

(65) Prior Publication Data

US 2021/0076651 A1 Mar. 18, 2021

(51) Int. Cl.
*A01K 85/08* (2006.01)
*A01K 85/14* (2006.01)
*A01K 91/04* (2006.01)

(52) U.S. Cl.
CPC .............. *A01K 85/08* (2013.01); *A01K 85/14* (2013.01); *A01K 91/04* (2013.01)

(58) Field of Classification Search
CPC ................................................ A01K 85/00–18
See application file for complete search history.

(56) References Cited

U.S. PATENT DOCUMENTS

| | | | | |
|---|---|---|---|---|
| 1,723,557 A * | 8/1929 | Kyujiro | .................. | A01K 85/16 |
| | | | | 43/42.28 |
| 4,163,337 A * | 8/1979 | Kress | .................... | A01K 85/00 |
| | | | | 43/42.25 |
| 6,044,583 A * | 4/2000 | Hay | ........................ | A01K 85/12 |
| | | | | 43/42.19 |
| 6,115,957 A * | 9/2000 | Bocach | .................. | A01K 85/16 |
| | | | | 43/42.22 |
| 6,219,955 B1 * | 4/2001 | Hnizdor | ................. | A01K 85/08 |
| | | | | 43/42.25 |
| 7,934,339 B2 * | 5/2011 | Richie | .................... | A01K 85/16 |
| | | | | 43/42.33 |
| 9,066,505 B1 * | 6/2015 | Vedder | .................. | A01K 85/01 |
| 2002/0178643 A1 * | 12/2002 | Brodeur | ................ | A01K 85/14 |
| | | | | 43/42 |
| 2003/0163945 A1 * | 9/2003 | Okada | .................... | A01K 85/08 |
| | | | | 43/42.36 |
| 2008/0202016 A1 * | 8/2008 | Robertson | ............. | A01K 85/08 |
| | | | | 43/42.27 |

(Continued)

OTHER PUBLICATIONS https://www.amazon.com/YDZN-Seawater-Trolling-Mackerel-Baits-Black/dp/B071XWZKWX/ref=sr_1_8?dchild=1&keywords=flying+fishing+lure&qid=1630088662&sr=8-8 (Year: 2017).*

(Continued)

*Primary Examiner* — Timothy D Collins
*Assistant Examiner* — Maria E Graber
(74) *Attorney, Agent, or Firm* — Thrasher Associates

(57) ABSTRACT

The invention is a fishing lure that attracts predatory fish including pelagic fish such as istiophoriformes including without limitation billfish, tuna, mackerel, wahoo, sailfish and marlins, by mimicking an injured flying fish. The lure includes a head comprising a fish mask that has two eye sockets on its exterior on which are affixed artificial eyes, and an interior cavity. The lure also includes a body comprising a first squid skirt, and a first wing and a second wing such that each wing is coupled to the head. The head also comprises an opening that is adapted to receive a fishing line therethrough, the opening is shaped to allow the angle of the line to change in the opening so that the lure moves back-and-forth and up-and-down when pulled in water. The action of the wing mimics an injured flying fish when breaking the water's surface.

19 Claims, 4 Drawing Sheets

(56) References Cited

U.S. PATENT DOCUMENTS

| | | | | |
|---|---|---|---|---|
| 2010/0236130 A1* | 9/2010 | Basso | ............... | A01K 85/01 43/42.31 |
| 2012/0017488 A1* | 1/2012 | Partridge | ............... | A01K 85/02 43/42.36 |
| 2015/0230441 A1* | 8/2015 | Steer | ............... | A01K 85/02 43/42.09 |

OTHER PUBLICATIONS https://www.amazon.com/6th-Sense-Quake-Lipless-Crankbait/dp/B08LP49Z6M/ref=sr_1_1?dchild=1&keywords=sixth+sense+quake+craw+fire+lure&qid=1630348887&sr=8-1 (Year: 2017).*

* cited by examiner

ARTIFICIAL FISHING LURE

TECHNICAL FIELD

The invention is related to fishing lures, and particularly fishing lures used to attract and catch predatory fish.

PROBLEM STATEMENT AND HISTORY

Interpretation Considerations

This section describes technical field in detail and discusses problems encountered in the technical field. Therefore, statements in the section are not to be construed as prior art.

Discussion of History of the Problem

Fishing is in the blood of mankind. Among the earliest writings and images of ancient Egypt and Babylonia are images of individuals fishing. In fact, common tomb themes describe an abundant day of fishing as the basis of an ideal after-life. Since that time over 5000 years ago, fishermen have endeavored to craft better, more customized lures to catch specific fish, even in different environments.

More recently, tin minnows, spoons, artificial grubs, and classes of lures such as poppers and top-water lures—even lures that have LEDs and GPS tracking. However, the primary mission of the lure remains the same: to attract a fish's attention, get the fish to instinctively compel the fish to instinctively strike or bite the lure, to hook the fish, and to bring it to the fisherman.

Lures for catching marlins and sailfish (or, more broadly, Istiophoridae and other pelagic species) have become increasingly complex and technical. For example, a September 2018 article entitled *Best Blue Marlin Lures* and available at MarlinMag.com, features nine lures each touted for turbulence, underwater undulation, angled-heads, double-tapered plungers, and bevelling. However, the very divergence of the designs and behaviours of these lures demonstrate that an optimal design and behaviour for a lure to catch predatory pelagic fish regardless of class, species has not yet been achieved.

Accordingly, there is the need for a fishing lure that attracts these fish, compels them to instinctively bite the lure so that they are hooked the rest is up to the skill of the individual fisherman). The present invention provides such devices.

SUMMARY

The invention provides a fishing lure in the form of a young injured flying fish. The fishing lure is generally definable by a head having a skull formed from a "fish mask." The skull has an exterior surface, a cavity defining an interior surface, and an opening at a tip. The exterior surfacing has a first eye-socket into which is attached an artificial eye, and a second eye-socket into which is attached a second artificial eye. The opening traverses the skull from the exterior surface to the interior surface, is adapted for receiving a fishing line, and is at least ⅕ a width of the skull, and ¹/₁₀ a height of the skull.

The lure also has a body generally definable by one or more squid skirts. Squid skirts have a head and tentacles, and the head is secured into the skull's interior. Attached to the body is a first wing and a second wing. The first wing is coupled between the interior surface and the body near the first eye socket, and similarly the second wing is coupled between the interior surface and the body near the second eye socket;

BRIEF DESCRIPTION OF THE DRAWINGS

Various aspects of the invention and its embodiment are better understood by referring to the following detailed description. To understand the invention, the detailed description should be read in conjunction with the drawings, in which.

DESCRIPTION OF AN EXEMPLARY PREFERRED EMBODIMENT

Interpretation Considerations

Figure 1:
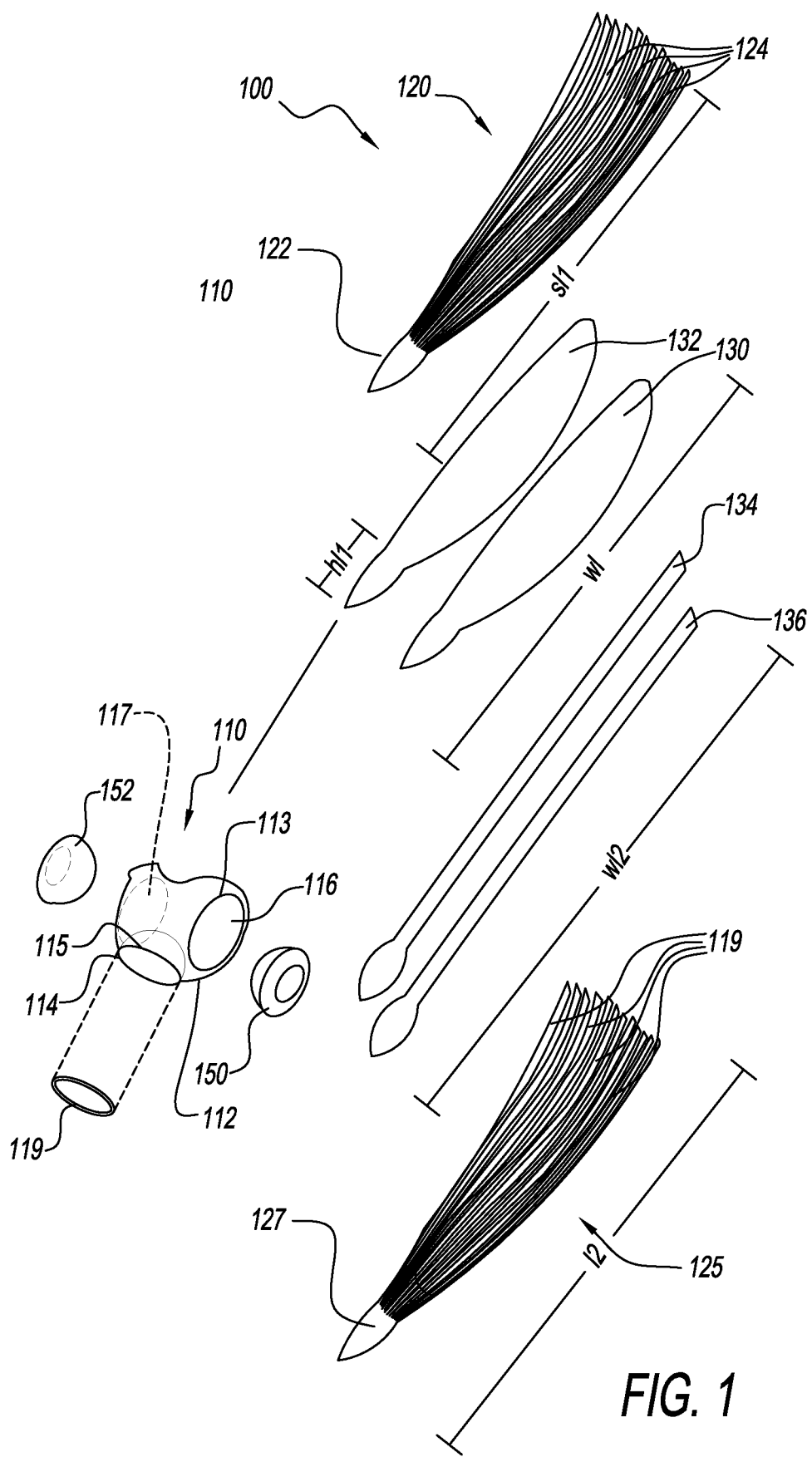
FIG. 1 is an exploded isometric view of an embodiment of the invention.

While reading this section (An Exemplary Embodiment, which describes the exemplary embodiment of the best mode of the invention, hereinafter referred to as "exemplary embodiment"), one should consider the exemplary embodiment as the best mode for practicing the invention during filing of the patent in accordance with the inventor's belief. As a person with ordinary skills in the art may recognize substantially equivalent structures or substantially equivalent acts to achieve the same results in the same manner, or in a dissimilar manner, the exemplary embodiment should not be interpreted as limiting the invention to one embodiment.

The discussion of a species (or a specific item) invokes the genus (the class of items) to which the species belongs as well as related species in this genus. Similarly, the recitation of a genus invokes the species known in the art. Furthermore, as technology develops, numerous additional alternatives to achieve an aspect of the invention may arise. Such advances are incorporated within their respective genus and should be recognized as being functionally equivalent or structurally equivalent to the aspect shown or described.

A function or an act should be interpreted as incorporating all modes of performing the function or act, unless otherwise explicitly stated. For instance, attaching may be performed mechanically, or with adhesives, or with pressure, or with heat. Therefore, the use of the word "attaching" invokes "mechanical attachment" or "adhesion" and all other modes of this word and similar words.

Unless explicitly stated otherwise, conjunctive words (such as "or", "and", "including", or "comprising") should be interpreted in the inclusive and not the exclusive sense.

As will be understood by those of the ordinary skill in the art, various structures and devices are depicted as simplified shapes to not obscure the invention. In the following discussion, acts with similar names are performed in similar manners, and parts with similar name are similar, unless otherwise stated.

The foregoing discussions and definitions are provided for clarification purposes and are not limiting. Words and phrases are to be accorded their ordinary, plain meaning, unless indicated otherwise.

Description of the Drawings, a Preferred Embodiment

The present invention is a lure that attracts predatory fish that eat other fish, and in particular fish in the order Istiophoriformes (which includes sailfish and marlins) as well as fish in the pelagic class of fish (such as billfish, tuna, mackerel, wahoo, sailfish and marlins). Attraction is achieved by mimicking the appearance and behavior of a favorite food source: flying fish, and in particular injured baby and juvenile and adult flying fish (each according its size). The desired behavior is achieved by an opening in the head of the lure as well as 'wings' that are shaped and attached as described below, while the desired appearances are described in conjunction with the structural description.

FIG. 1 is an exploded isometric view of a fishing lure 100. The fishing lure 100 includes a head 110 comprising a skull 111 having an exterior surface 112, a cavity defined by an interior surface 113, and an opening 114 at a tip 115. The opening 114 may be round or oval as described in later figures, and is preferably at least $\frac{1}{8}^{th}$ the width (w) of the head and at least $\frac{1}{10}^{th}$ the height (h) of the head, and preferably $\frac{4}{8}^{th}$ the width and $\frac{1}{8}^{th}$ the height. The opening 114 allows a fishing line or hook to pass (or traverse) therethrough. Additionally, in a preferred embodiment, the opening 114 may be molded (manufactured) with a smooth curved lip. Likewise, the opening 114 shown has a soft rubber gasket 119 or a thin coating (such as a silicon coating) for preventing or resisting the cutting of a fishing line from the fishing lure 100. Of course, these features may be combined.

The exterior surface 112 has a first side having a first eye-socket 116, and a second side having a second eye-socket 117. Accordingly, a first artificial fish eye 150 is attached to (occupies) the first eye socket 116 and a second artificial fish eye 152 is attached to (occupies) the second eye socket 117. Preferably, an artificial eye 150, 152 is preferably round or oval, and each artificial eye 150, 152 may have a pupil, as described in FIG. 2B below. However, in an alternative embodiment artificial fish eyes may occupy the eye-sockets via painting or printing, for example.

The fishing lure 100 also includes one or more squid skirts that define a body. The body of FIG. 1 includes at least a first squid skirt 120 which has a head 122, a plurality of tentacles 124, and is a length defined as a first squid skirt length (sl1). The head 122 of the first squid skirt 120 is secured in the cavity in the head 110, preferably by affixing the head to the interior surface 113 with adhesive.

Further, a second squid skirt 125 is shown. Similar to the first squid skirt 120, the second squid skirt 125 has a head 127 and a plurality of tentacles 129, the head 127 of the second squid skirt 125 is also secured to the interior surface 113 of the head 110 adjacent to the first squid skirt 120. The second squid skirt 125 preferably has a length (also called "the second squid skirt length") that is approximately the same as the first squid skirt length (sl1).

A squid skirt may be (and at times must be) modified to "fit" into the head chosen. One way to accomplish this is by cutting each squid skirt head as needed to achieve the desired fit. A second way of modifying a squid skirt is to mold each squid skirt to a predetermined size and shape to fit into a head (along with the wing and other components that may be added to the lure, known and unknown, both foreseeable and unforeseeable.

The squid skirts 120, 125 are preferably approximately 4.5 to 5 inches in length, but may also be approximately 2.5 inches, 6 to 7.5 inches, 8 to 9.5 inches, or 10 to 12.5 inches (or even larger), depending on the size of the desired bait (flying fish lure), also being matched to the size of the head/skull.

The squid skirts 120, 125 may be of the same or similar colors. However, it is preferred that the first squid skirt 120 be of a solid or multi-colored. When the first squid skirt 120 is a bright color, then it and the second squid skirt 125 can be arranged such that the first squid skirt 120 is secured into an interior portion of the skull 111, the second squid skirt 125 being secured into the first squid skirt 120 itself. In this configuration, the second squid skirt 125 can be of a lighter color, and thus the fishing lure 100 can take on a realistic-looking appearance.

The first wing 130 has a length (wl) that could be shorter than, about the same, or longer than the length of the first squid skirt (length sl1). The second wing 132 has a length approximately the same size at the first wing length (wl). The first wing 130 is also said to have a head length (hl). It is this head length (hl) that is secured into the head 110, and is typically coupled between the interior surface 113 and the body 100 proximate to the first eye socket 116. The wing length (wl) and the head length (hl) of the second wing 132 are approximately the same as the corresponding lengths of the first wing 130. Accordingly, the head length of the second wing 132 is also coupled between the interior surface 113 and the body 100, but instead is proximate to the second eye socket 117.

Also shown in FIG. 1 is a third wing 134 that has a second wing length (wl2), and a fourth wing 136 having a similar length. The third and fourth wings 234, 136 are coupled to the interior surface 113. However the third wing 134 is affixed adjacent to the first wing 130 near (proximate to) the first eye socket 116, and the fourth wing 136 is affixed adjacent to the second wing 132 near (proximate to) the second eye socket 117.

The wings 130, 132, 134, 136 may be made of PVC, polyester, or special polyester materials such as Mylar® or an equivalent, for example. In one embodiment, the first and second wings 130, 132 have a first layer of a first material, and a second layer of a polyester material, where the second layer is Mylar® and is positioned away from the body so that a pattern (preferably resembling fish scales) is visible on an assembled fishing lure. More preferably still, the pattern is a holographic pattern that resembles fish scales.

The wings 130-136 may have a variety of shapes for both appearance and performance. For example, in FIG. 1 the first wing 130 and the second wing 132 have the shape of an air-foil, which the third wing 134 and the fourth wing 136 have the shape of a trapezoid (minus the head-length portions of the wings 130-136). The wings may be of similar shapes or different shapes to each other, and also of similar or dissimilar sizes or lengths. Lastly, the skirt(s) 120, 125 and wings 130-136 are securely attached to the head, which is typically accomplished with an adhesive, by heat-curing, or mechanical means, for example.

Figure 2A:
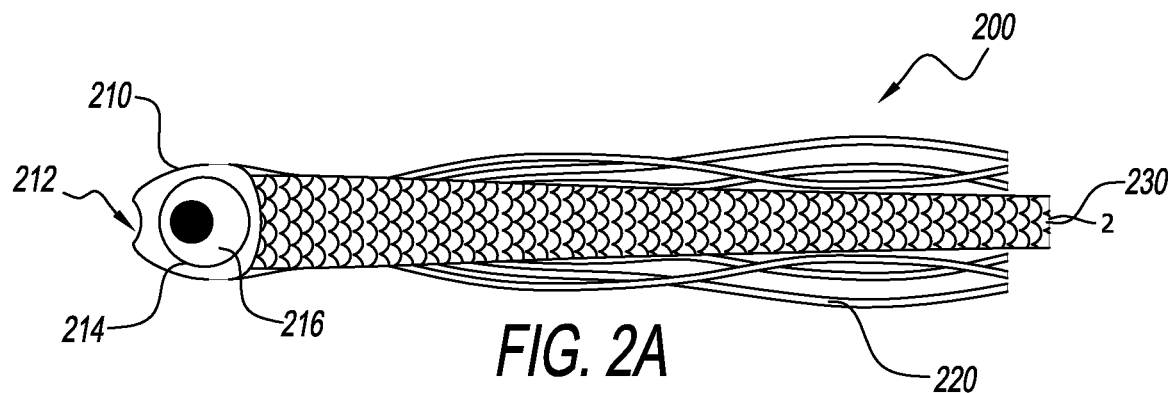
FIG. 2A illustrates a side-view of an embodiment of the invention.

FIG. 2A illustrates a side-view of an assembled inventive fishing lure 200. Here, a head 210 has an opening 212 and an eye 216 coupled to an eye socket 214 are shown assembled, and coupled to a squid skirt 220 and wings 230

Figure 2B:
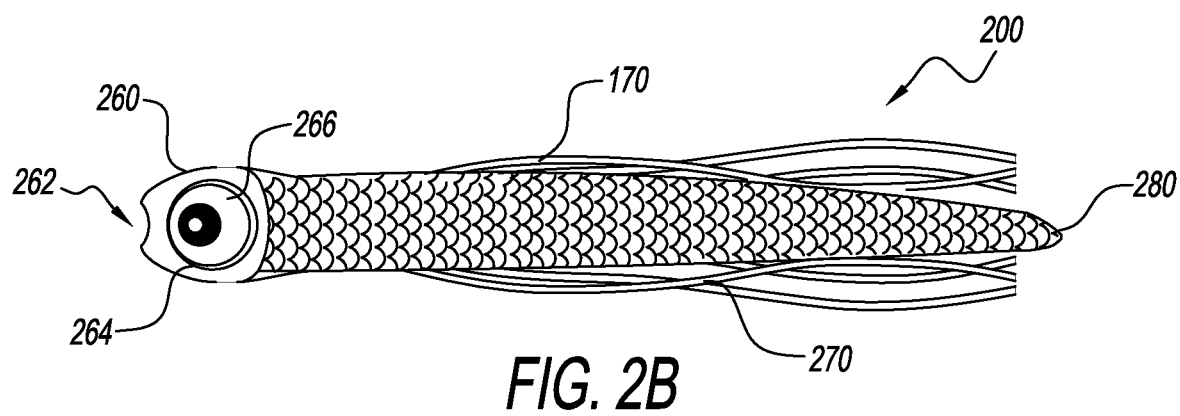
FIG. 2B is a side-view of an alternative embodiment of the invention having wings shaped similar to a cross-section of an airfoil.

(the details of the squid skirt 220 and wing 230 are omitted from the FIGS. 2A and 2B, and so the second wing is not illustrated).

FIG. 2B is a side-view of an alternative embodiment of an inventive fishing lure 250 having wings (only the first wing 280 is shown) shaped similar to a cross-section of an airfoil. In FIG. 2B a head 260 has an opening 262 and an eye 266 coupled to an eye socket 264 are shown assembled, and coupled to a squid skirt 270 and wings 280. Here, the artificial eyes 266 (other not shown) have a pupil 267 that is offset from the center of the eye, and are positioned in their respective sockets such that each pupil faces towards the tip of the head 260.

Figure 2C:
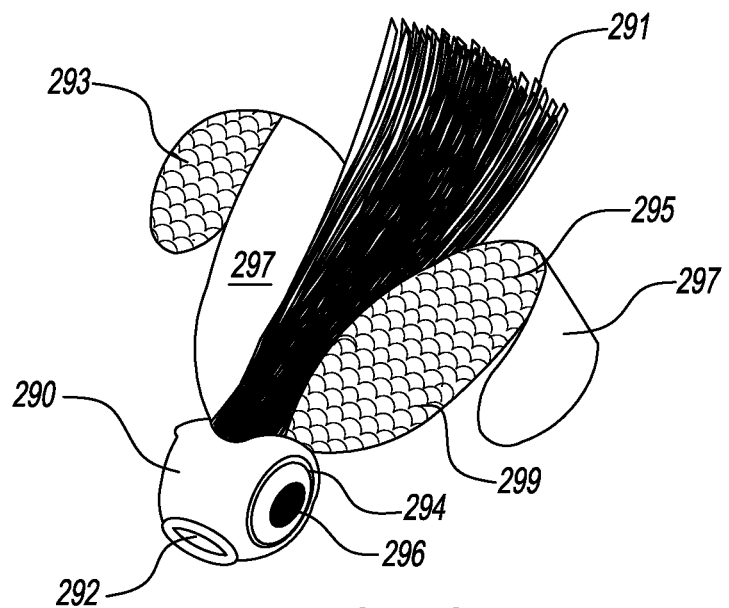
FIG. 2C is an isometric-view of an alternative embodiment of the invention having curled wings.

FIG. 2C is an isometric-view of an alternative embodiment of the invention having wing which curl away from the body. Here, a head 290 has an opening 292 and an eye 296 coupled to an eye socket 294 are shown assembled, and coupled to a squid skirt 291 and wings 293, 295. Here, the wings are curled (or swirled) to allow the wing to "fold out" when the lure exits the water, thus creating a more life-like appearance for a predator fish. Shown in FIG. 2C (and also alternatively applicable to all embodiments) is that each wing 293, 295 has a first wing surface 297 of a first material, and a second wing surface 299 which may be of a similar or dissimilar material. Two wing surfaces 297, 299 are provided so that they may have different patterns (or no pattern at all) embossed/printed thereon.

Figure 3A:
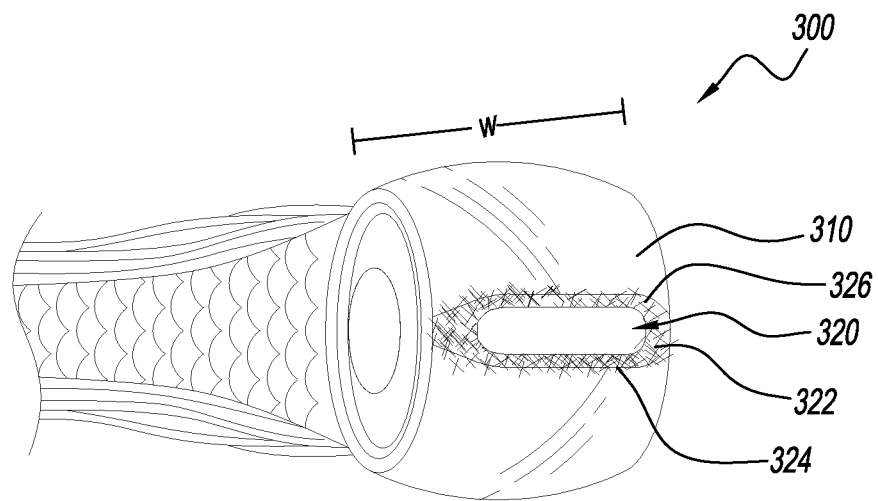
FIG. 3A illustrates a close-up view of a head.

FIG. 3A provides a close-up view of a head 300. The opening 320 is slotted, and extends approximately the width of the surface 310 of the head 300. Further, the opening 320 may include tapering 322 between the surface 310 and the cavity portion of the opening 326. Further, a coating 324 is provided over the opening 320.

Figure 3B:
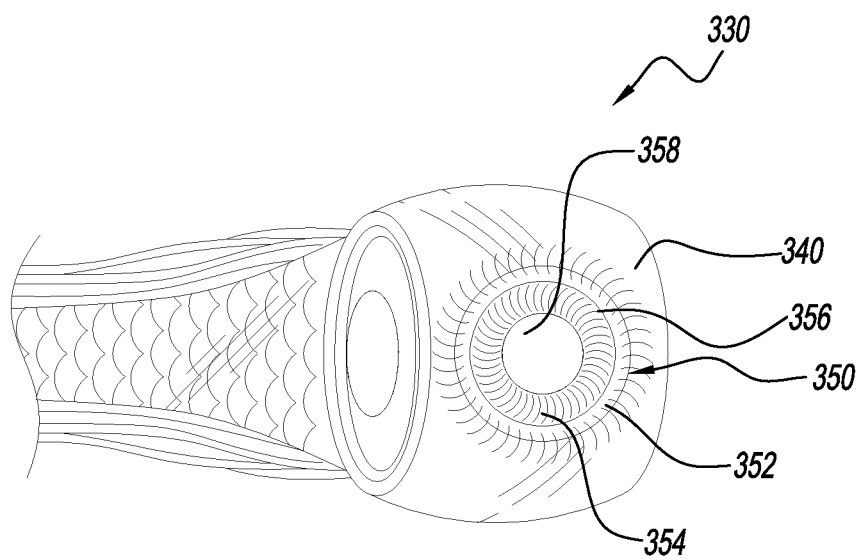
FIG. 3B is a close-up view of a first alternative head.

FIG. 3B is a close-up view of a first alternative head 330. Here, it is illustrated that the opening 350 may be round, is smaller than the width (w) of the surface 340 of the head 330. Further, the opening 350 may include tapering 354 between the surface 340 and the cavity portion of the opening 358. Further, both a gasket 352 and a coating 356 are provided over the opening 320.

Figure 3C:
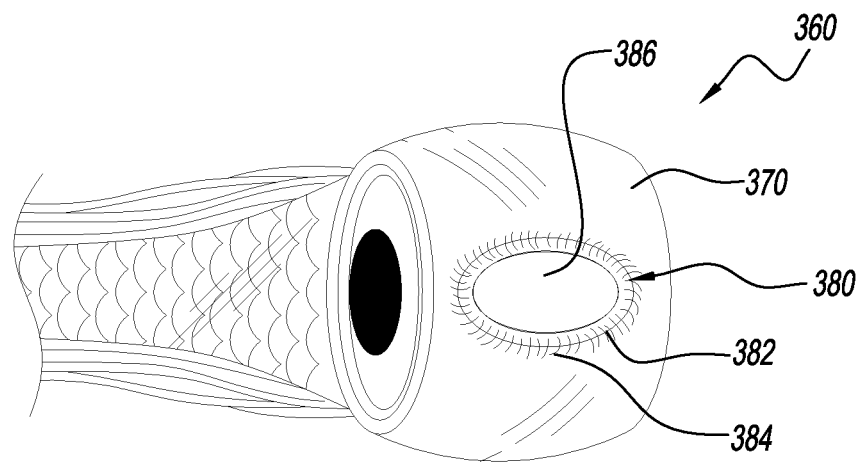
FIG. 3C is a close-up view of a second alternative head.

FIG. 3C is a close-up view of a second alternative head 360. In FIG. 3C the opening 380 is oval, and extends less than the width (w) of the surface 370 of the head 360. Further, the opening 380 includes tapering 382 between the surface 370 and the cavity portion of the opening 386. Further, a coating 384 is provided over the opening 380.

Figure 4:
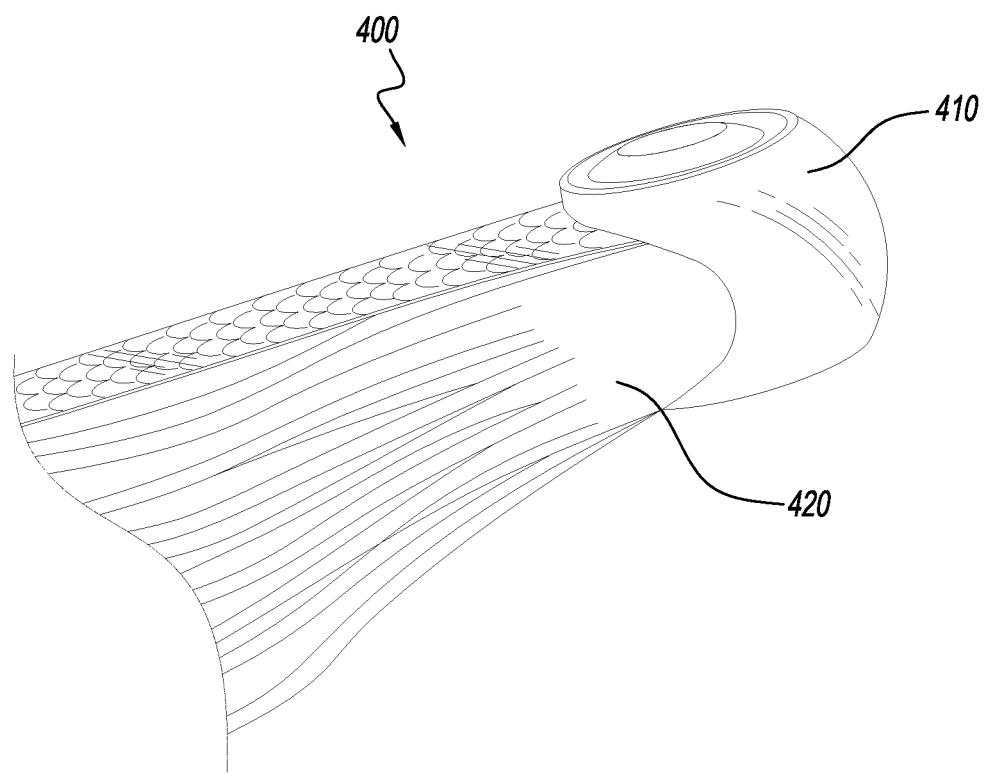
FIG. 4 illustrates a close, bottom-isometric view of a skirt coupled to a head.

FIG. 4 illustrates a close, bottom-isometric view of a skirt 420 coupled to a head 410.

In use, the fishing lure provides for a unique configuration of a head, eyes, wings, and skirt(s). This configuration creates a unique swim pattern for the fishing lure, both under the water as well as when breaking the surface of the water.

While under the water, the fishing lure appears to "swim" thanks to the fishing lure's unique ability to take advantage of waves, currents, and speed (of the boat pulling it). Thus, the fishing lure appears to be swimming side-to-side with wings pressed against the body, as well as swimming up-and-down with wings flexing both against and away from the body.

Having a slotted, oval and/or round-shaped opening in the tip of the head provides easy attachment of a line to the fishing lure. And, the opening allows the fishing line to travel in a side-to-side and/or up-and-down direction through the mouth, thereby creating a unique swim pattern for the fishing lure.

When in the water, water flows through the opening in the head causing the fishing lure to mimic (or "present") itself as live flying fish bait by "jigging" in the water, which attracts more fish. Then, when the fishing lure breaks the surface of the water, it appears to be skipping on top of the water, flexing its wings against and away-from its body, but for relatively short distance as compared to live, healthy flying fish. For this reason, the fishing lure mimics the action of an injured flying fish on the surface. This attracts the fish.

Although the invention has been described and illustrated with specific illustrative embodiments, it is not intended that the invention be limited to those illustrative embodiments. Those skilled in the art will recognize that variations and modifications can be made without departing from the spirit of the invention. For example, heads may have different sizes depending on the size of fish hook and skirt to be used. In alternative embodiments, Fish-Skull® Fish-Mask™ #10 may be used, which has dimensions of 15 mm×14 mm×14 mm, and which may fit hook sizes 4/0, 5/0, 6/0, or larger. The size of a head may be selected to match the size of the eyes to be used. For example, Fish-Skull® Fish-Mask™ #10 matches eyes having a size of 10 mm (⅜ inches). Of course, smaller or larger sized heads may be used without departing from the present disclosure. Therefore, it is intended to include within the invention, all such variations and departures that fall within the scope of the appended claims and equivalents thereof.

I claim:

1. A fishing lure, comprising:
    a head comprising a skull, the skull comprising an exterior surface, a cavity defining an interior surface, and an opening at a tip,
    the exterior surface comprising a first side having a first eye-socket, and a second side having a second eye-socket;
    a body comprising at least a first squid skirt having a first squid skirt length, the first squid skirt comprises a head and a plurality of tentacles, the head of the first squid skirt being secured into the interior surface;
    a first wing having a first wing length, and a second wing also having the first wing length, the first wing having a head length that is coupled between the interior surface and the body proximate to the first eye socket, and the second wing also having a head length that is coupled between the interior surface and the body proximate to the second eye socket;
    a first artificial fish eye occupies the first eye socket, and a second artificial fish eye occupies the second eye socket; and
    the opening traverses the skull from the exterior surface to the interior surface, is adapted for receiving a fishing line, and is at least ⅕ a width of the skull, and 1/10 a height of the skull.

2. The lure of claim 1 wherein the at least a first squid skirt, the first wing and the second wing are securely attached to the head.

3. The lure of claim 2 wherein the at least a first squid skirt, the first wing and the second wing attach to the interior of the head.

4. The lure of claim 1 wherein the artificial eyes comprise a pupil that is offset from center, and each artificial eye is positioned in its respective socket such that each pupil faces towards the tip.

5. The lure of claim 1 wherein each artificial eye is round or oval in shape.

6. The lure of claim 1 wherein each wing comprises PVC.

7. The lure of claim 1 wherein each wing comprises polyester.

8. The lure of claim 1 wherein each wing comprises a first layer of a first material, and a second layer of a polyester material.

9. The lure of claim 8 wherein the second layer comprises polyester film, is positioned away from the body, and comprises a pattern thereon.

10. The lure of claim 9 wherein the first and second wing comprise a layer with a holographic pattern thereon for resembling fish scales.

11. The lure of claim 1 further comprising a third wing having a second wing length, and a fourth wing also having a second wing length, the third wing having a head length that is coupled between the interior surface and the first wing proximate to the first eye socket, and the fourth wing having a head length that is coupled between the interior surface and the second wing proximate to the second eye socket.

12. The lure of claim 1 wherein the first wing and second wing have the shape of an elongated trapezoid along three sides that do not comprise the head-length.

13. The lure of claim 1 wherein the first wing and the second wing have the shape of a cross-section of an air-foil along three sides that do not comprise the head-length.

14. The lure of claim 1 wherein the first wing and the second wing curl away from the body.

15. The lure of claim 1 wherein the squid skirt head is modified to fit into the interior of the skull.

16. The lure of claim 1 wherein the opening is round, oval or slotted.

17. The lure of claim 1 wherein the opening comprises a soft rubber coating for preventing the cutting of a fishing line from the lure.

18. The lure of claim 1 wherein the opening comprises a gasket coupled to the opening for preventing cutting of a fishing line from the lure.

19. The lure of claim 1 further comprising a second squid skirt comprising a head and a plurality of tentacles, the head of the second squid skirt being secured into the interior surface adjacent to the first squid skirt.

\* \* \* \* \*